United States Patent
Son et al.

(10) Patent No.: US 8,574,779 B2
(45) Date of Patent: Nov. 5, 2013

(54) MIXED REACTANT FUEL CELL SYSTEM

(75) Inventors: In-Hyuk Son, Suwon-si (KR); Sang-Il Han, Suwon-si (KR); Chan Kwak, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1234 days.

(21) Appl. No.: 11/808,735

(22) Filed: Jun. 12, 2007

(65) Prior Publication Data

US 2007/0292739 A1    Dec. 20, 2007

(30) Foreign Application Priority Data

Jun. 16, 2006    (KR) .................. 10-2006-0054453

(51) Int. Cl.
*H01M 8/04*    (2006.01)
*H01M 8/10*    (2006.01)

(52) U.S. Cl.
USPC ............ 429/448; 429/454; 429/483; 429/492

(58) Field of Classification Search
USPC .................................................. 429/30–34
See application file for complete search history.

(56) References Cited

U.S. PATENT DOCUMENTS

| | | | |
|---|---|---|---|
| 6,620,537 B2 | 9/2003 | Struthers | |
| 7,014,929 B2* | 3/2006 | Champion et al. | 429/13 |
| 2003/0170524 A1* | 9/2003 | Kordesch et al. | 429/34 |
| 2004/0096721 A1 | 5/2004 | Ohlsen | |
| 2005/0031918 A1* | 2/2005 | Barber et al. | 429/17 |
| 2005/0175878 A1* | 8/2005 | Rusek | 429/30 |
| 2005/0266281 A1 | 12/2005 | Adams | |
| 2006/0078782 A1* | 4/2006 | Martin et al. | 429/38 |
| 2006/0083959 A1* | 4/2006 | Eritate et al. | 429/12 |

FOREIGN PATENT DOCUMENTS

JP    2006-114349    4/2006

* cited by examiner

*Primary Examiner* — Jun Li
(74) *Attorney, Agent, or Firm* — Robert E. Bushnell, Esq.

(57) ABSTRACT

The provided is a mixed reactant fuel cell system that includes a fuel cell body including a membrane-electrode assembly, a fuel tank, and a fuel pump. The fuel tank stores a mixed fuel including a hydrocarbon-based fuel and hydrogen peroxide ($H_2O_2$). The hydrogen peroxide ($H_2O_2$) acts as an oxidant. The fuel pump supplies the mixed fuel into the fuel cell body to generate electricity. An anode included in the membrane-electrode assembly includes a catalyst that selectively activates the oxidation reaction of the hydrocarbon-based fuel. A cathode included in the membrane-electrode assembly includes a catalyst that selectively activates the reduction reaction of the oxidant in the cathode. Therefore, when the mixed fuel is injected into both of the anode and the cathode, only an oxidation reaction of the fuel is carried out in the anode, and only a reduction reaction of the oxidant is carried out in the cathode.

12 Claims, 2 Drawing Sheets

MIXED REACTANT FUEL CELL SYSTEM

CLAIM OF PRIORITY

This application makes reference to, incorporates the same herein, and claims all benefits accruing under 35 U.S.C. §119 from an application for MIXED REACTANT FUEL CELL SYSTEM earlier filed in the Korean Intellectual Property Office on 16 Jun. 2006 and there duly assigned Serial No. 10-2006-0054453.

BACKGROUND OF THE INVENTION

1. Field of the Invention

The present invention relates to a mixed reactant fuel cell system. More particularly, the present invention relates to a mixed reactant fuel cell system that is adapted to operation at low temperature and that has high efficiency.

2. Description of the Related Art

A fuel cell is a power generation system for producing electrical energy through an electrochemical redox reaction of an oxidant and hydrogen in a hydrocarbon-based material such as methanol, ethanol, or natural gas.

Such a fuel cell is a clean energy source that can replace energy sources that use fossil fuels. The fuel cell includes a stack composed of unit cells, and produces various ranges of power. Since the fuel cell has four to ten times higher energy density than a small lithium battery, it has been attracted as a small portable power source.

Exemplary fuel cells include a polymer electrolyte membrane fuel cell (PEMFC) and a direct oxidation fuel cell (DOFC). The direct oxidation fuel cell includes a direct methanol fuel cell that uses methanol for a fuel.

The polymer electrolyte fuel cell has an advantage of high energy density and high power, but it also has problems that it requires carefully handling of hydrogen gas and accessory facilities such as a fuel reforming processor for reforming methane or methanol, natural gas, or the like in order to produce hydrogen for the fuel gas.

On the contrary, a direct oxidation fuel cell has lower energy density than the polymer electrolyte fuel cell, but has the advantages of easy handling of fuel, lower operation temperature, and no need for additional fuel reforming processors.

SUMMARY OF THE INVENTION

The present invention provides a mixed reactant fuel cell system that is adapted to operation at low temperature and has high efficiency.

According to one embodiment of the present invention, provided is a mixed reactant fuel cell system that includes a fuel tank for storing a mixed fuel including a hydrocarbon-based fuel and a hydrogen peroxide ($H_2O_2$), a fuel cell body for generating electricity, and a fuel pump coupled to each of the fuel tank and the fuel cell body. The fuel pump supplies the mixed fuel of the fuel tank to the fuel cell body. The fuel cell body includes an anode, a cathode, a polymer electrolyte membrane disposed between an inner surface of the anode and an inner surface of the cathode, and an electrode substrate arranged on an outer surface of the anode or on an outer surface of the cathode.

The hydrogen peroxide ($H_2O_2$) mixed in the mixed fuel is in an amount of 0.1M to 10M with respect to 1M of hydrogen generated from the hydrocarbon-based fuel. Preferably, the hydrogen peroxide ($H_2O_2$) is in an amount of 1M to 3M with respect to 1M of hydrogen generated from the hydrocarbon-based fuel.

The anode comprises an anode catalyst that selectively activates the oxidation reaction of the hydrocarbon-based fuel. The cathode comprises a cathode catalyst that selectively activates the reduction reaction of an oxidant supplied from the hydrogen peroxide ($H_2O_2$).

The fuel cell body may further includes a housing for accommodating the anode, the cathode, the polymer electrolyte membrane, and the electrode substrate, an inlet disposed at one side of the housing, and an outlet disposed at another side of the housing. The mixed fuel may be supplied into the housing through the inlet; and unreacted mixed fuel may be released from the housing through the outlet.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
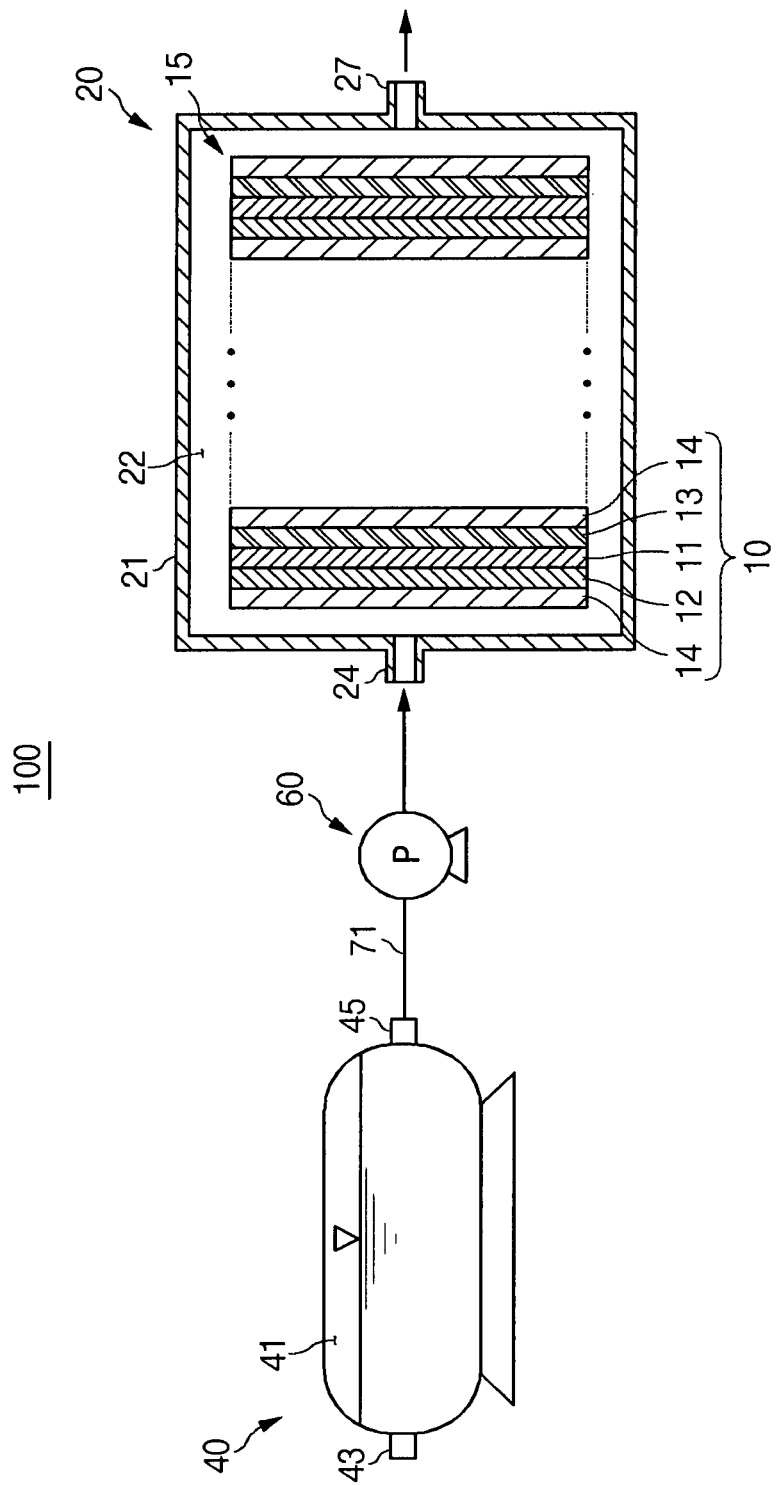
FIG. 1 schematically shows the structure of a mixed reactant fuel cell system constructed as an embodiment of the present invention.

A fuel cell is a power generation system producing electrical energy from an oxidation reaction of a fuel and a reduction reaction of an oxidant. It generally includes a fuel supplier, a stack, and an oxidant supplier.

The stack is a member that generates electrical energy using a fuel and an oxidant supplied from a fuel supplier and an oxidant supplier, respectively. The stack is generally composed of several membrane-electrode assemblies with a separator disposed between them. The membrane-electrode assembly includes an anode and a cathode, and a polymer electrolyte membrane that transfers protons that are generated on the anode to the cathode. The fuel and the oxidant are supplied through the separator to the anode and the cathode, respectively, for the reaction in the fuel cell. The separator physically separates the membrane-electrode assemblies.

In a fuel cell system, a fuel and an oxidant are injected to the anode and the cathode, respectively. The performance of fuel cells, however, deteriorates if the fuel is supplied to the cathode or the oxidant is supplied to the anode. Therefore, the separator is required to prevent inflowing between the two electrodes.

A mixed reactant fuel cell includes a catalyst that selectively activates the oxidation reaction of the fuel in the anode, and another catalyst that selectively activates the reduction reaction of the oxidant in the cathode. Thereby, when the mixture of the fuel and the oxidant is injected into both of the anode and the cathode, only an oxidation reaction of the fuel is carried out in the anode, and only a reduction reaction of the oxidant is carried out in the cathode.

The mixed reactant fuel cell does not requires separators that are needed to isolate each membrane-electrode assembly in fuel cells, and cross-over of fuel is not considered. Therefore, the mixed reactant fuel cell can remarkably reduce production costs for a fuel cell and a size of a fuel cell.

However, since the oxidant pump and the fuel pump are used to mix the oxidant and the fuel at a certain ratio, the BOP (balance of plant) consuming electric power increases, and an additional space for a device is necessary to provide a high energy density. Further, it has drawbacks in that heat for reaction must be supplied from the outside to increase the reaction temperature when high power is required.

According to one embodiment of the present invention, provided is a mixed reactant fuel cell system that solves these drawbacks by using hydrogen peroxide ($H_2O_2$). The mixed reactant fuel cell system of one embodiment of the present invention includes a fuel cell body including a membrane-electrode assembly, a fuel tank, and a fuel pump.

The membrane-electrode assembly includes an anode, a cathode, and a polymer electrolyte membrane arranged between the anode and the cathode. An electrode substrate is arranged on at least one electrode of the anode and cathode. In other words, the polymer electrolyte membrane is disposed between an inner surface of the anode and an inner surface of the cathode, while the electrode substrate is disposed on an outer surface of the anode or on an outer surface of the cathode.

The fuel tank stores a mixed fuel including a hydrocarbon-based fuel and hydrogen peroxide ($H_2O_2$). The fuel pump supplies the mixed fuel to the fuel cell body, and is disposed at a connection line between the fuel cell body and the fuel tank.

According to one embodiment of the present invention, hydrogen peroxide ($H_2O_2$) is used in mixed with the hydrocarbon-based fuel. Hydrogen peroxide ($H_2O_2$) acts as an oxidant, and has the same effect as an oxidant such as oxygen supplied into the hydrocarbon-based fuel. Thereby, it is possible to supply both of the fuel and the oxidant through only the fuel pump without using an additional oxidant pump in order to mix the oxidant and the fuel. Since the overall volume may be reduced by not using the additional oxidant pump, the size of the fuel cell system of the present invention can be reduced. In addition, it can save the BOP consuming electric power, and noise during operation decreases. Furthermore, temperature of the reaction stack increases by heat generated during the decomposition of hydrogen peroxide ($H_2O_2$), and therefore fuel is prevented from freezing even at low temperature. Therefore, the fuel cell system of the present invention can be used at low temperature. The reaction initial maneuver time is short and uniform reaction occurs to provide a fuel cell system having a high efficiency high energy density.

According to one embodiment of the present invention, hydrogen peroxide ($H_2O_2$) is mixed in an amount of 0.1M to 10M with respect to 1M of hydrogen that is produced from a hydrocarbon-based fuel. For example, if methanol ($CH_3OH$) is used as the hydrocarbon-based fuel, 3M of $H_2$ is generated per 1M of methanol. In this case, 0.3M to 30M of hydrogen peroxide ($H_2O_2$) can be mixed with 1M of methanol. According to another embodiment, the amount of hydrogen peroxide ($H_2O_2$) ranges from 1M to 3M with respect to 1M of hydrogen. If the amount of hydrogen peroxide ($H_2O_2$) is less than 0.1M, the amount of oxygen, which is required for the electrochemical reaction, is not sufficient to obtain a sufficient output power. If the amount of hydrogen peroxide ($H_2O_2$) is greater than 10M, an excessive amount of oxygen is generated, and hydrogen is wasted through hydrogen oxidation reaction. Thereby, the efficiency decreases and heat is overproduced.

The hydrocarbon-based fuel includes methanol, ethanol, propanol, butanol, or natural gas.

In the membrane-electrode assembly of the fuel cell, the anode includes a catalyst that selectively activates the oxidation reaction of the fuel. Representatively, platinum-ruthenium may be used for the catalyst of the anode. A platinum-ruthenium alloy catalyst also can be used for the anode, but is not limited thereto.

The cathode includes any catalyst that selectively activates the reduction reaction of the oxidant. Representatively, RuS, RuSe, Fe—N/C, or Co—N/C, in which transition elements are bound to nitrogen and dispersed on a carbon carrier, can be used for the catalyst of the cathode. The cathode catalyst may include a material such as Fe-tetraphenylporphyrin (Fe-TPP), Co-tetraphenylporphyrin, (Co-TPP), Fe-tetramethoxyphenylporphyrin, (Fe-TMPP), Co-tetramethoxyphenylporphyrin (Co-TMPP), Fe-phthalocyanine (Fe—PC), Co-phthalocyanine (Co—PC), Ru—S, Ru—Se, Ru—Mo—S, Ru—Mo—Se, Ru—W—S, or Ru—W—Se. These catalyst materials have high activity and selectivity for oxidant reduction.

In particular, the Fe-tetraphenylporphyrin (Fe-TPP), Co-tetraphenylporphyrin (Co-TPP), Fe-tetramethoxyphenylporphyrin (Fe-TMPP), Co-tetramethoxyphenylporphyrin (Co-TMPP), Fe-phthalocyanine (Fe—PC), and Co-phthalocyanine (Co—PC) may be heat-treated in order to obtain an excellent catalyst effect.

The catalyst may be used in a form of a metal itself (black catalyst), or in a form supported on a carrier. The carrier may include carbon such as acetylene black, denka black, activated carbon, ketjen black, graphite, or so on, or an inorganic particulate such as alumina, silica, titania, zirconia, or so on. The carbon may be generally used.

The catalyst and the anode may further include a binder resin to improve its adherence and proton transference.

The binder resin may be at least one proton conductive polymer selected from the group consisting of fluoro-based polymers such as perfluorosulfonate, polyamide-based polymers, polyether-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. The H may be substituted with Na, K, Li, Cs, or tetrabutyl ammonium in an ion exchange group of the terminal end at the proton conductive polymer. When the H is substituted with Na in an ion exchange group at the terminal end of the proton conductive group, NaOH is used during preparation of a catalyst layer composition. When the H is substituted with tetrabutyl ammonium, tetrabutyl ammonium hydroxide is used. K, Li, or Cs can also be substituted by using appropriate compounds. A method of substituting H is known in the related art, and therefore is not described in detail.

The binder resin may be used singularly or as a mixture. Optionally, the binder resin may be used along with a non-conductive polymer to further improve adherence strength between a polymer electrolyte membrane and the catalyst layer. The use amount of the binder resin may be adjusted to its usage purpose.

Non-limiting examples of the non-conductive polymer include polytetrafluoroethylene (PTFE), tetrafluoroethylene-hexafluoropropylene (FEP) copolymers, tetrafluoroethylene-perfluoro alkyl vinylether (PFA) copolymers, ethylene/tetrafluoroethylene (ETFE), ethylenechlorotrifluoro-ethylene (ECTFE) copolymers, polyvinylidene fluoride, polyvinylidene fluoride-hexafluoropropylene (PVdF-HFP) copolymers, and combinations thereof.

The polymer electrolyte membrane transfers protons, which are produced from an anode catalyst layer, to a cathode catalyst layer, and is made of a high proton conductive polymer. In general, a polymer electrolyte membrane for a mixed reactant fuel cell can have pores to diffuse a fuel and an oxidant.

The proton conductive polymer resin may be a polymer resin having a cation exchange group such as a sulfonic acid group, a carboxylic acid group, a phosphoric acid group, a phosphonic acid group, or derivatives thereof, at its side chain.

Non-limiting examples of the polymer resin include a compound such as fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, or polyphenylquinoxaline-based polymers. In one embodiment, the proton conductive polymer is a compound such as poly(perfluorosulfonic acid) (NAFION™), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly(2,5-benzimidazole).

The hydrogen (H) in the proton conductive group of the proton conductive polymer can be substituted with Na, K, Li, Cs, or tetrabutylammonium. When the H in the ionic exchange group of the terminal end of the proton conductive polymer side is substituted with Na or tetrabutylammonium, NaOH or tetrabutylammonium hydroxide may be used during preparation of the catalyst composition, respectively. When the H is substituted with K, Li, or Cs, suitable compounds for the substitutions may be used. Since such a substitution is known in the art, a detailed description thereof is omitted.

For the electrode substrate, a conductive substrate is used. For example carbon paper, carbon cloth, carbon felt, or metal cloth (a porous film comprising metal cloth fiber or a metalized polymer fiber) can be used, but it is not limited thereto.

The electrode substrate is positioned on either of the anode or the cathode, and thereby diffuses a fuel and an oxidant to a catalyst layer. Even if the electrode substrate is positioned on either of the anode or cathode, the electrode substrate may be positioned between membrane-electrode assemblies when the membrane-electrode assemblies are stacked. Accordingly, a short-circuit does not occur therein.

However, when a membrane-electrode assembly including an electrode substrate only on either of an anode and a cathode is stacked, one of two outer membrane-electrode assemblies should include an electrode substrate on both sides of the anode and the cathode.

According to one embodiment of the present invention, the membrane-electrode assembly for a mixed reactant fuel cell may include a porous anode, a porous cathode, a porous electrode substrate, and a porous polymer electrolyte membrane. Furthermore, the porosity and pore size are not required to be limited in this invention because they may be adjusted to be suitable for diffusing a fuel and an oxidant. A mixed reactant fuel cell system of the present invention may includes a passage which is formed to penetrate through the entire stack that is stacked with at least one membrane-electrode assembly. In the mixed reactant fuel cell system including the stack with a passage, the reactant to be injected is more effectively and rapidly diffused into the stack through the passage.

Hereinafter, a mixed reactant fuel cell system constructed as an embodiment of the present invention will be described referring to the attached drawings.

FIG. 1 schematically shows the structure of a mixed reactant fuel cell system constructed as one embodiment of the present invention. Mixed reactant fuel cell system 100 includes fuel cell body 20 including at least one membrane-electrode assembly 10, fuel tank 40 for storing a mixed fuel including a hydrocarbon-based fuel and hydrogen peroxide ($H_2O_2$), and fuel pump 60 to supply the mixed fuel stored in fuel tank 40 to fuel cell body 20.

According to one embodiment, fuel cell body 20 includes stack 15 in which a plurality of membrane-electrode assemblies 10 are successively stacked, housing 21 accommodating stack 15, inlet 24 for supplying the mixed fuel into housing 21, and outlet 27 releasing unreacted mixed fuel from housing 21. Membrane-electrode assembly 10 includes anode 12, cathode 13, polymer electrolyte membrane 11 arranged between anode 12 and cathode 13, and electrode substrate 14 arranged on another surface of anode 12. The electrode substrate positioned on cathode 13 is an electrode substrate positioned on another surface of an anode of next membrane-electrode assembly.

In fuel cell body 20, housing 21 is composed of a case surrounding entire stack 15, and provides containing space 22 for stack 15. Inlet 24 is disposed at one side of housing 21 and provides a hole for injecting the mixed fuel from fuel tank 40 into containing space 22 of housing 21. Outlet 27 is disposed at the other side of housing 21, and provides a hole for releasing the remained mixed fuel that is not reacted in membrane-electrode assembly 10 from containing space 22 of housing 21.

Fuel tank 40 includes storing space 41 storing the mixed fuel, tank inlet 43 to inject the mixed fuel to storing space 41, and tank outlet 45 to release the mixed fuel stored in storing space 41.

Fuel pump 60 is mounted in connection pipe line 71 connecting tank outlet 45 of fuel tank 40 to inlet 24 of fuel cell body 20. Fuel pump 60 releases the mixed fuel stored in storing space 41 of fuel tank 40 through tank outlet 45 of fuel tank 40 with a predetermined pumping pressure, and sends the mixed fuel into housing 21 of fuel cell body 20 through connection line 71.

According to mixed reactant fuel cell system 100 having the above-mentioned structure, a mixed fuel of the hydrocarbon-based fuel and the hydrogen peroxide ($H_2O_2$) is released through tank outlet 45 by the pumping pressure of fuel pump 60. Mixed fuel flows along with connection line 71, and is injected into storing space 22 of housing 21 through inlet 24 of housing 21. Then, hydrogen peroxide ($H_2O_2$) is electrochemically and chemically reacted in stack 15 to generate OH— and as an oxygen oxidant. Thereby, the catalyst layer of the anode and the cathode are reacted along with the fuel and the oxidant, respectively, to generate electrical energy. The remained mixed fuel that is not reacted by membrane-electrode assembly 10 in containing space 22 of housing 21 is released through outlet 27 of housing 21.

Figure 2:
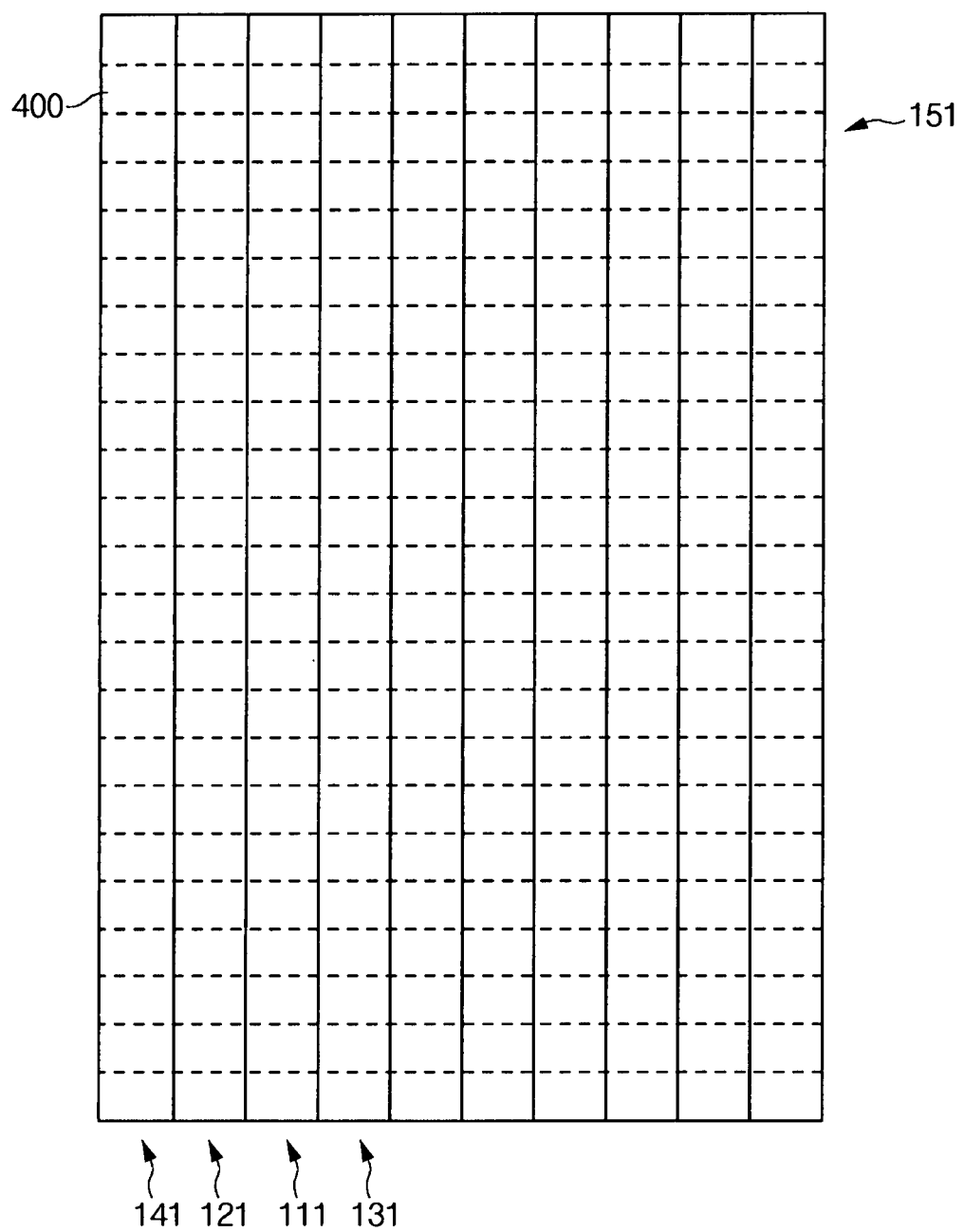
FIG. 2 schematically shows a stack of a mixed reactant fuel cell system constructed as another embodiment of the present invention.

FIG. 2 schematically shows a stack of a mixed reactant fuel cell system constructed as another embodiment of the present invention, in which at least one membrane-electrode assembly of a stack includes a passage. In stack 151, passage 400 penetrates through anode 121, cathode 131, polymer electrolyte membrane 111, and electrode substrate 141.

The following examples illustrate the present invention in more detail. However, it is understood that the present invention is not limited by these examples.

Example 1

88 wt % of Pt—Ru black (Johnson Matthey) and 12 wt % of a binder that includes 5 wt % of NAFION/$H_2O$/2-propanol (Solution Technology Inc.) were mixed to prepare a catalyst composition for an anode. 88 wt % of Ru Se/C and 12 wt % of a binder that includes 5 wt % of NAFION/$H_2O$/2-propanol (Solution Technology Inc.) were mixed to prepare a catalyst composition for a cathode. A carbon paper electrode including 0.2 mg/cm$^2$ of carbon was coated with the anode catalyst composition to fabricate an anode. A carbon paper electrode including 1.3 mg/cm$^2$ of carbon was coated with the cathode catalyst composition to fabricate a cathode. Herein, the loading amount of the catalyst in the anode and the cathode was 4 mg/cm$^2$.

A unit cell was fabricated by sequentially stacking the anode, NAFION 115 (perfluorosulfonic acid) polymer electrolyte membrane that is commercially available, and the cathode. A stack of a fuel cell system was made by stacking a plurality of the unit cell, and then, a fuel cell system was fabricated in the structure as shown in FIG. 1.

The fuel cell system was driven by supplying a fuel mixture to the stack through a fuel pump. The fuel mixture included 1M of methanol and 3M of hydrogen peroxide ($H_2O_2$), and was stored in a fuel tank.

Example 2

A fuel cell system was fabricated in accordance with the same procedures as in Example 1, except that 2M of hydrogen peroxide ($H_2O_2$) was used.

Example 3

A fuel cell system was fabricated in accordance with the same procedures as in Example 1, except that 9M of hydrogen peroxide ($H_2O_2$) was used.

Example 4

A fuel cell system was fabricated in accordance with the same procedures as in Example 1, except that 12M of hydrogen peroxide ($H_2O_2$) was used.

Comparative Example 1

A fuel of 1M of methanol and an oxidant of air were mixed to supply to a stack of a mixed reactant fuel cell system.

The power of the fuel cell systems of Examples 1 to 4 and Comparative Example 1 were measured. The results are shown in the Table 1. The power ratios is a ratio of power of fuel cells with respect to the power of fuel cell of Comparative Example 1 (power of a fuel cell divided by the power of the fuel cell of Comparative Example 1).

TABLE 1

|  | Power ratio |
| --- | --- |
| Example 1 | 2 times |
| Example 2 | 1.2 times |
| Example 3 | 3 times |
| Example 4 | 2 times |
| Comparative Example 1 | 1 time |

Example 5

A fuel cell system was fabricated in accordance with the same procedures as in Example 1, except that Fe-tetraphenylporphyrin (Fe-TPP) was used instead of Ru Se/C.

Example 6

A fuel cell system was fabricated in accordance with the same procedures as in Example 5, except that 2M of hydrogen peroxide ($H_2O_2$) was used.

Example 7

A fuel cell system was fabricated in accordance with the same procedures as in Example 5, except that 9M of hydrogen peroxide ($H_2O_2$) was used.

Example 8

A fuel cell system was fabricated in accordance with the same procedures as in Example 5, except that 12M of hydrogen peroxide ($H_2O_2$) was used.

The power of the fuel cell systems of Examples 5 to 8 were measured. It was found that the power levels of the fuel cell systems of Examples 5 to 8 were significantly higher than the power level of the fuel cell system of Comparative Example 1.

As described above, the mixed reactant fuel cell system does not require an oxidant pump due to the use of a mixed fuel including a hydrocarbon-based fuel and hydrogen peroxide ($H_2O_2$), and thereby the volume of a fuel cell system can be reduced, and a fuel cell with high efficiency can be achieved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mixed reactant fuel cell system comprising:
   a mixed fuel including a hydrocarbon-based fuel and a hydrogen peroxide ($H_2O_2$), the hydrogen peroxide ($H_2O_2$) in the mixed fuel being in an amount of 3M to 4M with respect to 1M of hydrogen generated from the hydrocarbon-based fuel;
   a fuel tank storing the mixed fuel;
   a fuel cell body for generating electricity, the fuel cell body comprising:
   an anode;
   a cathode;
   a polymer electrolyte membrane disposed between an inner surface of the anode and an inner surface of the cathode; and
   an electrode substrate arranged on an outer surface of the anode or on an outer surface of the cathode; and
   a fuel pump coupled to each of the fuel tank and the fuel cell body, the fuel pump supplying the mixed fuel of the fuel tank to the fuel cell body.

2. The mixed reactant fuel cell system of claim 1, wherein the anode comprises an anode catalyst that selectively activates the oxidation reaction of the hydrocarbon-based fuel.

3. The mixed reactant fuel cell system of claim 1, wherein the cathode comprises a cathode catalyst that selectively activates the reduction reaction of an oxidant supplied from the hydrogen peroxide ($H_2O_2$).

4. The mixed reactant fuel cell system of claim 1, wherein the fuel cell body comprises:
   a housing for accommodating the anode, the cathode, the polymer electrolyte membrane, and the electrode substrate;

an inlet disposed at one side of the housing, the mixed fuel being supplied into the housing through the inlet; and an outlet disposed at another side of the housing, unreacted mixed fuel being released from the housing through the outlet.

5. The mixed reactant fuel cell system of claim 1, wherein the anode, the cathode, the polymer electrolyte membrane, and the electrode substrate are included in a membrane-electrode assembly, the fuel cell body comprises a plurality of membrane-electrode assemblies for generating electricity.

6. The mixed reactant fuel cell system of claim 1, wherein the mixed reactant fuel cell system includes a direct oxidation fuel cell system.

7. The mixed reactant fuel cell system of claim 1, comprised of the polymer electrolyte membrane having a passage penetrating the polymer electrolyte membrane, the mixed fuel flowing though the passage.

8. The mixed reactant fuel cell system of claim 1, wherein the mixed fuel is supplied to both of the anode and the cathode.

9. The mixed reactant fuel cell system of claim 2, wherein the anode catalyst selectively activates the oxidation reaction of the fuel.

10. The mixed reactant fuel cell system of claim 2, wherein the anode catalyst includes platinum-ruthenium.

11. The mixed reactant fuel cell system of claim 3, wherein the cathode catalyst selectively activates the reduction of the oxidant.

12. The mixed reactant fuel cell system of claim 3, wherein the cathode catalyst includes one selected from the group consisting of RuS, RuSe, Fe—N/C, Co—N/C, Fe-tetraphenylporphyrin (Fe-TPP), Co-tetraphenylporphyrin, (Co-TPP), Fe-tetramethoxyphenylporphyrin, (Fe-TMPP), Cotetramethoxyphenylporphyrin (Co-TMPP), Fe-phthalocyanine (Fe—PC), Co-phthalocyanine (Co—PC), Ru—S, Ru—Se, Ru—Mo—S, Ru—Mo—Se, Ru—W—S, Ru—W—Se, and combinations thereof.

* * * * *